(12) United States Patent
Kolari et al.

(10) Patent No.: US 9,018,141 B2
(45) Date of Patent: Apr. 28, 2015

(54) BIOCIDAL SYSTEM AND METHODS OF USE

(71) Applicants: Marko Kolari, Vantaa (FI); Sherrill Gammon, Kennesaw, GA (US); Jaakko Simell, Helsinki (FI)

(72) Inventors: Marko Kolari, Vantaa (FI); Sherrill Gammon, Kennesaw, GA (US); Jaakko Simell, Helsinki (FI)

(73) Assignee: Kemira Oyj, Helsinki (FI)

( * ) Notice: Subject to any disclaimer, the term of this patent is extended or adjusted under 35 U.S.C. 154(b) by 1 day.

(21) Appl. No.: 13/734,390

(22) Filed: Jan. 4, 2013

(65) Prior Publication Data

US 2013/0190214 A1    Jul. 25, 2013

Related U.S. Application Data

(60) Provisional application No. 61/583,949, filed on Jan. 6, 2012.

(51) Int. Cl.
| | |
|---|---|
| C09K 8/52 | (2006.01) |
| C09K 8/60 | (2006.01) |
| C09K 8/035 | (2006.01) |
| C09K 8/58 | (2006.01) |
| C09K 8/68 | (2006.01) |

(52) U.S. Cl.
CPC ............ C09K 8/605 (2013.01); C09K 8/035 (2013.01); C09K 8/58 (2013.01); C09K 8/68 (2013.01)

(58) Field of Classification Search
None
See application file for complete search history.

(56) References Cited

U.S. PATENT DOCUMENTS

| | | | |
|---|---|---|---|
| 3,067,095 A | 12/1962 | Baltazzi | |
| 3,377,275 A | 4/1968 | Michalski et al. | |
| 5,069,286 A * | 12/1991 | Roensch et al. | 166/312 |
| 5,256,182 A | 10/1993 | Friedman, Jr. et al. | |
| 7,008,545 B2 * | 3/2006 | Cronan et al. | 210/755 |
| 7,786,054 B2 | 8/2010 | Starkey, II et al. | |
| 7,906,463 B2 * | 3/2011 | Starkey et al. | 507/211 |
| 2008/0029266 A1 | 2/2008 | Starkey et al. | |
| 2009/0088483 A1 | 4/2009 | Anker et al. | |
| 2012/0285693 A1 | 11/2012 | Mirakyan et al. | |
| 2013/0190214 A1 | 7/2013 | Kolari et al. | |

FOREIGN PATENT DOCUMENTS

| | | |
|---|---|---|
| GB | 1458041 | 12/1976 |
| WO | WO 2009/015089 | 1/2009 |
| WO | WO 2012/012158 | 1/2012 |

OTHER PUBLICATIONS

International Search Report for PCT/FI2013/050007, issued May 14, 2013.
International Search Report for corresponding international application PCT/US14/33061, issued Aug. 20, 2014.

* cited by examiner

*Primary Examiner* — Alicia Bland
(74) *Attorney, Agent, or Firm* — King & Spalding

(57) ABSTRACT

Methods of treating a gas field fluid or oil field fluid is provided, the method comprising: a) adding glutaraldehyde to the gas field fluid or oil field fluid in an amount effective to reduce or inhibit microbial activity; and b) after a delay, adding 3,5-dimethyl-1,3,5-thiadiazinane-2-thione to the gas field fluid or oil field fluid.

7 Claims, 5 Drawing Sheets

BIOCIDAL SYSTEM AND METHODS OF USE

CROSS REFERENCE TO RELATED APPLICATION

This application claims priority to U.S. Provisional Patent Application No. 61/583,949, filed Jan. 6, 2012, which is incorporated by reference in its entirety.

FIELD OF THE ART

The present disclosure relates methods of treating fluids with biocidal systems to reduce or inhibit microbial growth or activity.

BACKGROUND

In the oil and gas industry, the development and operation of the oil field and gas field go through several distinct phases, all of which can be affected by unwanted microbial growth or activity. Microbial contamination may occur during drilling of the well, preparing the well for production, i.e. stimulation, and production itself.

It is desirable for the efficiency and success of any oil or natural gas production operation to protect water-based fluids from microbial contamination. After a well is drilled into a subterranean geological formation that contains oil, natural gas, and water, every effort is made to maximize the production of the oil and/or gas. To increase the permeability and flow of the oil and/or gas to the surface, the drilled wells are often subjected to well stimulation. Well stimulation generally refers to several post drilling processes used to clean the wellbore, enlarge channels, and increase pore space in the interval to be injected thus making it possible for fluids to move more readily into and out of the formation. In addition, typical reservoir enhancement processes such as waterflood and/or chemical-flood need to utilize biocide as part of the waterflood and/or chemical-flood package.

A typical well or field treatment process generally includes pumping specially engineered fluids at high pressure and rate into the subterranean geological formation. The high-pressure fluid (usually water with some specialty high viscosity fluid additives) exceeds the rock strength and opens a fracture in the formation, which can extend out into the geological formation for as much as several hundred feet. Certain commonly used fracturing treatments generally comprise a carrier fluid (usually water or brine) and a polymer, which is also commonly referred to as a friction reducer. Many well stimulation fluids will further comprise a proppant. Other compositions used as fracturing fluids include water with additives, viscoelastic surfactant gels, gelled oils, crosslinkers, oxygen scavengers, and the like.

The well treatment fluid can be prepared by blending the polymer with a fluid, such as an aqueous solution. The purpose of the polymer is generally to increase the viscosity of the fracturing fluid that aids in the creation of a fracture; and to thicken the aqueous solution so that solid particles of proppant can be suspended in the solution for delivery into the fracture.

The polymers used in well treatment fluids are subjected to an environment conducive to bacterial growth and oxidative degradation. The growth of the bacteria on polymers used in such fluids can materially alter the physical characteristics of the fluids. For example, microbial activity can degrade the polymer, leading to loss of viscosity and subsequent ineffectiveness of the fluids. Fluids that are especially susceptible to microbial degradation are those that contain polysaccharide and/or synthetic polymers such as polyacrylamides, polyglycosans, carboxyalkyl ethers, and the like. In addition to microbial degradation, these polymers are susceptible to oxidative degradation in the presence of free oxygen. The degradation can be directly caused by free oxygen or mediated by microorganisms. Thus, for example, polyacrylamides are known to degrade to smaller molecular fragments in the presence of free oxygen. Because of this, biocides and oxygen scavengers are frequently added to the well treatment fluid to control microbial growth or activity and oxygen degradation, respectively. Desirably, the biocide is selected to have minimal or no interaction with any of the components in the well stimulation fluid. For example, the biocide should not affect fluid viscosity to any significant extent and should not affect the performance of oxygen scavengers contained within the fluid. The oxygen scavengers are generally derived from bisulfate salts.

Other desirable properties for the biocide may include: (a) cost effectiveness, e.g., cost per liter, cost per cubic meter treated, and cost per year; (b) safety, e.g., personnel risk assessment (for instance, toxic gases or physical contact), neutralization requirements, registration, discharge to environment, and persistence; (c) compatibility with system fluids, e.g., solubility, partition coefficient, pH, presence of hydrogen sulfide in reservoir or formation, temperature, hardness, presence of metal ions or sulfates, level of total dissolved solids; (d) compatibility with other treatment chemicals, e.g., corrosion inhibitors, scale inhibitors, demulsifiers, water clarifiers, well stimulation chemicals, and polymers; and (e) handling, e.g., corrosiveness to metals and elastomers, freeze point, thermal stability, and separation of components.

Commercially available biocides that are used to control the growth or activity of microorganisms in gas field and oil field applications include e.g. 3,5-dimethyl-1,3,5-thiadiazinane-2-thione, also named tetrahydro-3,5-dimethyl-2H-1,3,5-thiadiazine-2-thione (also commonly referred to as Dazomet or Thione), formaldehyde, glutaraldehyde and tetrakis(hydroxymethyl)phosphonium sulfate (THPS).

U.S. Pat. Nos. 7,906,463 and 7,786,054 (incorporated by reference in their entirety) disclose the use of 3,5-dimethyl-1,3,5-thiadiazinane-2-thione in gas or oil field stimulation fluids.

International Publication No. WO 2009/015089 (incorporated by reference in its entirety) discloses a biocidal mixture of glutaraldehyde and hydroxymethyl-substituted phosphorus compounds.

SUMMARY

Disclosed herein is a method of treating a gas field fluid or oil field fluid, the method comprising: a) adding glutaraldehyde to the gas field fluid or oil field fluid in an amount effective to reduce or inhibit microbial activity; and b) after a delay, adding 3,5-dimethyl-1,3,5-thiadiazinane-2-thione to the gas field fluid or oil field fluid; wherein the delay is from about 1 hour to about 48 hours.

DETAILED DESCRIPTION

Figure 1:
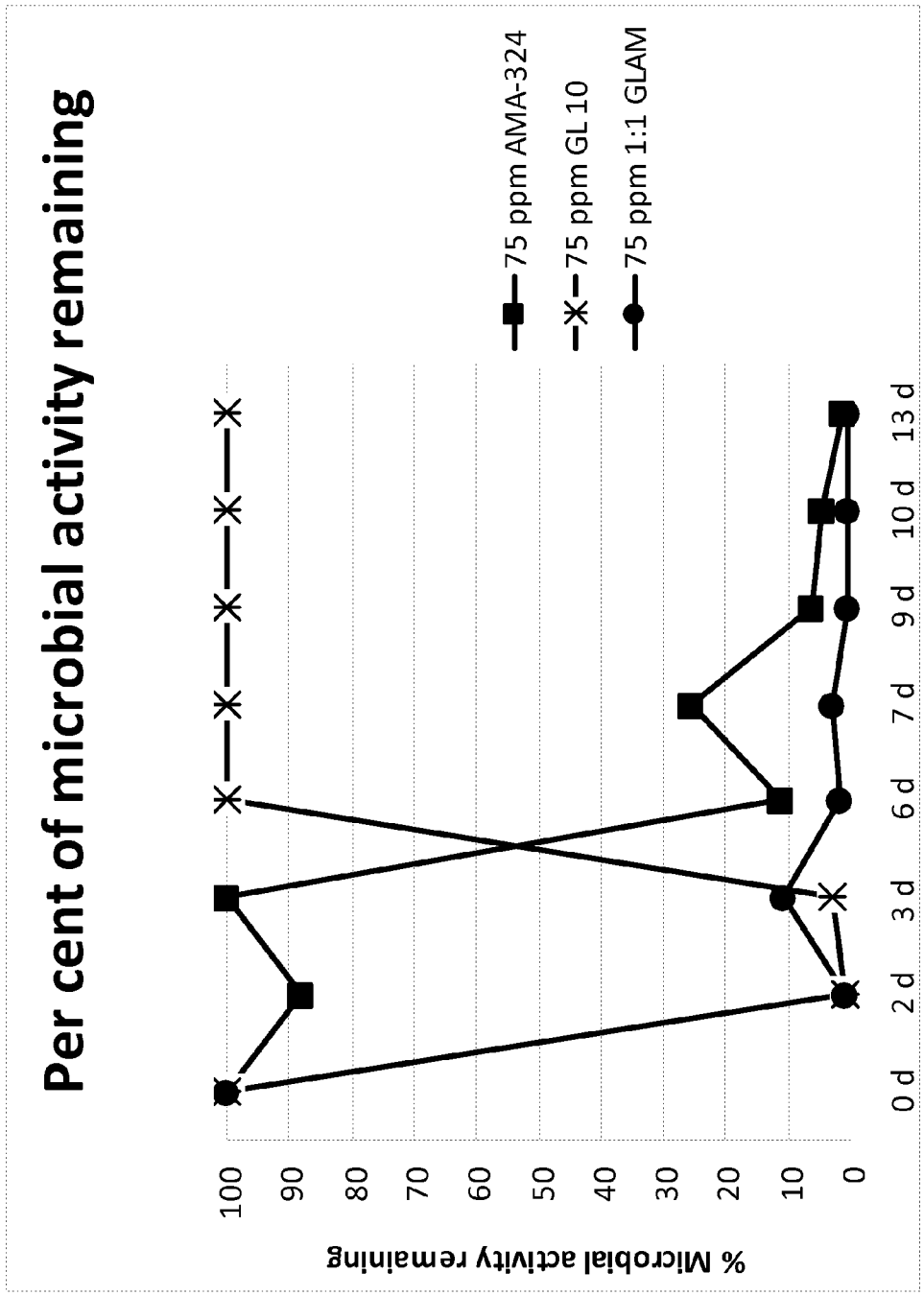
FIGS. 1, 2 and 3 are graphs which illustrate the effect of exemplary biocidal systems on the microbial activity of test samples, relative to an untreated sample.

Described herein are biocidal systems, fluids and methods that can be used to control, reduce or inhibit microbial growth and/or activity in a fluid, wherein the biocidal system comprises 3,5-dimethyl-1,3,5-thiadiazinane-2-thione and a non-oxidizing biocide, such as glutaraldehyde. The systems and methods disclosed herein are versatile and effective for use in gas field and oil field applications, especially in well stimulation fluids that can effectively control microbial contamination. The systems and methods described herein provide an enhanced antimicrobial activity. The enhanced antimicrobial activity of the combination of 3,5-dimethyl-1,3,5-thiadiazinane-2-thione and a non-oxidizing biocide, as used by the methods described herein, was unexpected as such biocides are incompatible. The exemplary methods disclosed herein provide not only a means to use both 3,5-dimethyl-1,3,5-thiadiazinane-2-thione and a non-oxidizing biocide in the same fluid, but also by doing so, enhancing the antimicrobial activity achieved with each of these biocides.

In exemplary embodiments, a biocidal system comprises 3,5-dimethyl-1,3,5-thiadiazinane-2-thione and a non-oxidizing biocide, for example glutaraldehyde. In exemplary embodiments, the biocidal system and methods described herein can be used to improve microbiological control in gas field or oil field applications. In certain embodiments, the methods provide a synergistic end result such that the antimicrobial activity of the system is improved over the antimicrobial activity of either biocide used alone at the same total dosage. In exemplary embodiments, the biocidal system effectively minimizes the activity of microbes in water-based fluid very soon after it is introduced into the fluid (fast kill), and also provides an extended long term microbial control or prevents microbial re-growth. In exemplary embodiments, the systems and methods can be used to treat, control, reduce or inhibit any microbial growth or activity in a gas field fluid or oil field fluid, for example planktonic or sessile microbial growth and/or activity.

Biocidal System

In exemplary embodiments, a biocidal system is provided comprising: 3,5-dimethyl-1,3,5-thiadiazinane-2-thione and a non-oxidizing biocide. The 3,5-dimethyl1,3,5-thiadiazinane-2-thione and the non-oxidizing biocide comprise a biocidal system which may be used to treat gas field fluids or oil field fluids and are added to such fluids separately and sequentially, according to the embodiments described herein.

In exemplary embodiments, the non-oxidizing biocide is glutaraldehyde. Another exemplary non-oxidizing biocide is a quaternary ammonium compound, including, for example, $C_8$-$C_{18}$ alkyl(dimethyl)benzylammonium salts, such as tetradecyldimethylbenzylammonium chloride or dodecyldimethylbenzylammonium chloride; $C_8$-$C_{18}$ alkyl(trimethyl)ammonium salts, such as dodecyltrimethylammonium chloride; and di($C_8$-$C_{18}$ alkyl)(dimethyl)ammonium salts, such as didecyldimethylammonium chloride or didecyldimethylammonium carbonate or bicarbonate. Another exemplary non-oxidizing biocide is a phosphonium salt, including, for example, tetrakis(hydroxymethyl)phosphonium salt, such as tetrakis(hydroxymethyl)phosphonium sulfate (THPS), tetrakis(hydroxymethyl)phosphonium chloride or tetrakis(hydroxymethyl)phosphonium phosphate; $C_1$-$C_3$ alkyl or $C_2$-$C_4$ alkenyl-tris(hydroxymethyl)phosphonium salts, such as chloride or sulfate salt; tributyl tetradecyl phosphonium chloride (TTPC); and tris(hydroxymethyl)phosphine $P(CH_2OH)_3$.

In exemplary embodiments, the non-oxidizing biocide is incompatible with 3,5-dimethyl-1,3,5-thiadiazinane-2-thione. For instance, when glutaraldehyde is combined with 3,5-dimethyl-1,3,5-thiadiazinane-2-thione in a mutual composition, e.g. in a composition containing both biocides that does not include substantial amounts of the gas field fluid or oil field fluid, the efficacy of each biocide is compromised. It is believed that when these biocides are combined, changes to the chemistries occur which may compromise the biocidal activity of each. For example, one theory is that the 3,5-dimethyl-1,3,5-thiadiazinane-2-thione may increase the pH and/or provide amine moieties, providing an environment conducive to cross-linking or polymerization of the glutaraldehyde. The resulting mixture may have reduced biocidal effectiveness, and/or may show signs of chemical incompatibility, such as yellowing or precipitation.

In exemplary embodiments, the system may comprise one or more additional biocides.

In exemplary embodiments, the weight ratio of 3,5-dimethyl-1,3,5-thiadiazinane-2-thione to the non-oxidizing biocide, as active ingredients, is in the range of about 15:1 to about 1:5, about 10:1 to about 1:3, about 5:1 to about 1:2, about 3:1 to about 1:2, about 2:1 to about 1:2, or about 1:1 to about 1:2.

In exemplary embodiments, the 3,5-dimethyl-1,3,5-thiadiazinane-2-thione and the non-oxidizing biocide are provided as individual compositions forming in situ a biocidal composition. In exemplary embodiments, the 3,5-dimethyl-1,3,5-thiadiazinane-2-thione and the non-oxidizing biocide are provided as individual compositions which are sequentially added to a gas field fluid or an oil field fluid after one or more specified delays so as to optimize or maximize the antimicrobial effects of the two biocides.

In exemplary embodiments, the biocidal system treats, controls, reduces or inhibits microbial growth and/or activity in a gas field fluid or oil field fluid. As used herein, the phrases "gas field fluid" or "oil field fluid" includes stimulation fluid, squeeze fluid, fracturing fluid, drilling mud, workover or completion fluid hydrotest fluid, water injection or fluid injection for reservoir maintenance or Enhanced Oil Recovery (EOR), or other like compositions. While the exemplary embodiments described herein are described with reference to gas field fluids or oil field fluids, it is understood that the embodiments may be used in one or more other applications, as necessary or desired.

Methods of Use

In exemplary embodiments, a method of treating a gas field fluid or oil field fluid is provided, the method comprising: a) adding a non-oxidizing biocide to the gas field fluid or oil field fluid in an amount effective to reduce or inhibit microbial activity; and b) after a delay, adding 3,5-dimethyl-1,3,5-thiadiazinane-2-thione to the gas field fluid or oil field fluid; wherein the delay is from about 1 hour to about 48 hours.

In exemplary embodiments, the method may be used to control the growth and/or activity of microorganisms in a gas field fluid or oil field fluid. In other embodiments, the method may be used to reduce or inhibit the microbial growth and/or activity in a gas field fluid or oil field fluid.

In an exemplary embodiment, the non-oxidizing biocide and 3,5-dimethyl-1,3,5-thiadiazinane-2-thione may be added to the fluid in any amount effective to reduce or inhibit microbial growth and/or activity as necessary or desired. In exemplary embodiments, the combined or total concentration, as active ingredients, of 3,5-dimethyl-1,3,5-thiadiazinane-2-thione and the non-oxidizing biocide in the fluid is greater than about 5 ppm, about 10 ppm, about 25 ppm, about 50 ppm, about 75 ppm, about 100 ppm, about 125 ppm, about 150 ppm, about 500 ppm or about 1000 ppm. In an exemplary embodiment, the combined concentration, as active ingredients, of 3,5-dimethyl-1,3,5-thiadiazinane-2-thione and the non-oxidizing biocide in the fluid is in the range of about 5 ppm to about 1000 ppm, about 25 ppm to about 800 ppm, about 50 ppm to about 600 ppm, about 75 ppm to about 500 ppm, or about 25 ppm to about 50 ppm. In exemplary embodiments, the concentration of the 3,5-dimethyl-1,3,5-thiadiazinane-2-thione in the fluid is at least about 5 ppm as active ingredient. In exemplary embodiments, the biocidal system may be added in any amount sufficient to produce a necessary or desired effect.

In exemplary embodiments, the components of the biocidal system (3,5-dimethyl1,3,5-thiadiazinane-2-thione and the non-oxidizing biocide) are separately added to a fluid as individual compositions. In exemplary embodiments, are composition or form of the 3,5-dimethyl-1,3,5-thiadiazinane-2-thione and the non-oxidizing biocide may be used to deliver the active form of the components to the fluid. For example, each component may be added directly or indirectly to the fluid, and each component may be in the form of an aqueous solution, dry form, emulsion, aqueous dispersion or any other liquid or solid form. Any composition comprising a component of the biocidal system may further comprise additives or diluents which do not adversely impact the component. In certain embodiments, the non-oxidizing biocide is in the form of an aqueous solution of glutaraldehyde, for example a 50% active aqueous solution of glutaraldehyde. In certain embodiments, 3,5-dimethyl-1,3,5-thiadiazinane-2-thione is in dry form, for example a granular solid or fine powder. In certain embodiments, 3,5-dimethyl-1,3,5-thiadiazinane-2-thione is in the form of an aqueous solution, for example a 24% active aqueous solution of 3,5-dimethyl-1,3,5-thiadiazinane-2-thione.

In exemplary embodiments, the components of the biocidal system are added sequentially to the fluid with a delay between the additions. In an exemplary embodiment, the 3,5-dimethyl-1,3,5-thiadiazinane-2-thione and the non-oxidizing biocide are added to the fluid sequentially and the non-oxidizing biocide is added first.

The delay between additions may be any amount of time as necessary or desired to achieve or maintain a predetermined level or profile of antimicrobial activity. In exemplary embodiments, the delay between the addition of the non-oxidizing biocide and the addition of the 3,5-dimethyl-1,3,5-thiadiazinane-2-thione is about 1 hour, about 2 hours, about 4 hours, about 6 hours, about 9 hours, about 12 hours, about 24 hours, about 27 hours, about 30 hours, about 36 hours, or about 48 hours. In exemplary embodiments, the delay between the addition of the non-oxidizing biocide and the addition of the 3,5-dimethyl-1,3,5-thiadiazinane-2-thione is at least about 1 hour, about 2 hours, about 4 hours, about 6 hours, about 9 hours, about 12 hours, about 24 hours, about 27 hours, about 30 hours, about 36 hours, or about 48 hours. In exemplary embodiments, the delay is from about 1 hour to about 2 hours, about 1 hour to about 4 hours, about 1 hour to about 6 hours, about 1 hour to about 9 hours, about 1 hour to about 27 hours, or about 1 hour to about 48 hours.

In exemplary embodiments, one or more of the components of the biocidal system may be added in multiple doses. For example, one or both of 3,5-dimethyl-1,3,5-thiadiazinane-2-thione and/or the non-oxidizing biocide may be added in a single dose or in multiple doses to a pipeline, reservoir or other part of a system.

In exemplary embodiments, the gas field fluid or oil field fluid may be a stimulation fluid, squeeze fluid, fracturing fluid, drilling mud, workover or completion fluid, hydrotest fluid, water injection or fluid injection for reservoir maintenance or Enhanced Oil Recovery (EOR).

In exemplary embodiments, a biocidal system comprising 3,5-dimethyl-1,3,5-thiadiazinane-2-thione and a non-oxidizing biocide may be used in a gas field or oil field application. In exemplary embodiments, a biocidal system comprising 3,5-dimethyl-1,3,5-thiadiazinane-2-thione and a non-oxidizing biocide may be used in a gas field fluid or oil field fluid. In exemplary embodiments, the gas field fluid or oil field fluid is a stimulation fluid, squeeze fluid, fracturing fluid, drilling mud, workover or completion fluid or hydrotest fluid. In exemplary embodiments, the biocidal system is used for inhibiting microbial growth or activity in a gas field fluid or oil field fluid.

In exemplary embodiments, the gas field fluid or oil field fluid comprises water, for example fresh water, saline water or recirculated water.

In exemplary embodiments, the gas field fluid or oil field fluid comprises water and a polymer.

In an exemplary embodiment the polymer may be any polymer used in a gas or oil field treatment fluid. In exemplary embodiments, the polymer comprises a polysaccharide, such as a galactomannan polymer, e.g. guar gum, a derivatized galactomannan polymer, starch, xanthan gum, a derivatized cellulose, e.g. hydroxycellulose or hydroxyalkyl cellulose; a polyvinyl alcohol polymer; or a synthetic polymer that is the product of a polymerization reaction comprising one or more monomers selected from the group consisting of vinyl pyrrolidone, 2-acrylamido-2-methylpropanesulfonic acid, acrylic acid, methacrylic acid, styrene sulfonic acid, acrylamide, and other monomers currently used for oil well treatment polymers. In exemplary embodiments, the polymer is water-soluble. Exemplary polymers include hydrolyzed polyacrylamide, guar gum, hydroxypropyl guar gum, carboxymethyl guar gum, carboxymethylhydroxypropyl guar gum, hydroxyethyl cellulose, carboxymethylhydroxyethyl cellulose, hydroxypropyl cellulose, copolymers of acrylic acid and/or acrylamide, xanthan, starches, and mixtures thereof, among others.

In an exemplary embodiment, the polymer is a copolymer of acrylic acid and/or acrylamide.

In exemplary embodiments, the gas field fluid or oil field fluid can further comprise one or more additives. For example, an additive may be included to provide any necessary or desired characteristic, such as to enhance the stability of the fluid composition itself to prevent breakdown caused by exposure to oxygen, temperature change, trace metals, constituents of water added to the fluid composition, and/or to prevent non-optimal crosslinking reaction kinetics. Often, the choice of components used in fluid compositions is determined to a large extent by the properties of the hydrocarbon-bearing formation on which they are to be used. Exemplary additives include, but are not limited to, oils, salts (including organic salts), crosslinkers, polymers, biocides, corrosion inhibitors and dissolvers, enzymes, pH modifiers (e.g., acids and bases), breakers, metal chelators, metal complexors, antioxidants, oxygen scavengers, wetting agents, polymer stabilizers, clay stabilizers, scale inhibitors and dissolvers, wax inhibitors and dissolvers, asphaltene precipitation inhibitors, water flow inhibitors, fluid loss additives, chemical grouts, diverters, sand consolidation chemicals, proppants, permeability modifiers, viscoelastic fluids, gases (e.g., nitrogen and carbon dioxide), foaming agents, defoaming agents, and controlled-release vehicles.

In an exemplary embodiment, the biocidal system may be used in a well stimulation application. For example, a fluid containing the biocidal system can be injected directly into the wellbore to react with and/or dissolve substances affecting permeability; injected into the wellbore and into the formation to react with and/or dissolve small portions of the formation to create alternative flowpaths; or injected into the wellbore and into the formation at pressures effective to fracture the formation.

In an exemplary embodiment, the fluid is a well injection composition. The well injection composition can comprise an injection fluid for removing a production fluid such as oil from a subterranean formation. The injection fluid can be any fluid suitable for forcing the production fluid out of the subterranean formation and into a production wellbore where it can be recovered. For example, the injection fluid can comprise an aqueous fluid such as fresh water or salt water (i.e., water containing one or more salts dissolved therein), e.g., brine (i.e., saturated salt water) or seawater.

In an exemplary embodiment, the well injection composition can be used in a flooding operation (e.g., secondary flooding as opposed to a primary recovery operation which relies on natural forces to move the fluid) to recover a production fluid, e.g., oil, from a subterranean formation. The flooding operation entails displacing the well injection composition through an injection well (or wells) down to the subterranean formation to force or drive the production fluid from the subterranean formation to a production well (or wells). The flooding can be repeated to increase the amount of production fluid recovered from the reservoir. In subsequent flooding operations, the injection fluid can be replaced with a fluid that is miscible or partially miscible with the oil being recovered.

An exemplary injection well can include a cement sheath or column arranged in the annulus of a wellbore, wherein the annulus is disposed between the wall of the wellbore and a conduit such as a casing running through the wellbore. Thus, the well injection composition can pass down through the casing into the subterranean formation during flooding. The biocidal system in the well injection composition can serve to reduce microbial growth or activity on the cement sheath and the conduit therein without significantly affecting the materials with which it comes in contact, including the components of the well injection composition.

The following examples are presented for illustrative purposes only, and are not intended to limit the scope of the invention.

EXAMPLES

Example 1

In this example, the performance of biocidal systems according to the embodiments were compared to commercially available biocides—glutaraldehyde (Fennosan GL 10, commercially available from Kemira Oyj, Helsinki, Finland), and 3,5-dimethyl-1,3,5-thiadiazinane-2-thione (AMA-324, commercially available from Kemira Chemicals, Inc., Atlanta, Ga.).

The exemplary biocidal systems included a combination of glutaraldehyde and 3,5-dimethyl-1,3,5-thiadiazinane-2-thione, in the relative amounts identified in Table 1, below. In each exemplary biocidal system, the components were sequentially added to a test fluid, as identified in Table 1, below. In Table 1, the term "GL 10" refers to Fennosan GL 10 and the term "GLAM" refers to a combination of Fennosan GL 10 and AMA-324. The ratio given for the "GLAM" combinations indicate the proportion of the commercial products of Fennosan GL 10 to AMA-324, e.g. "1:1 GLAM" means 1 part Fennosan GL 10 and 1 part AMA-324. Similarly, "1:2 GLAM" means 1 part Fennosan GL 10 and 2 parts AMA-324. The active ingredient concentrations for Fennosan GL 10 and AMA-324 are 50% and 24%, respectively.

TABLE 1

Biocidal System Samples, Example 1.

| Sample | Biocide added at 0 h | Biocide added at 2 d | Total biocides added |
|---|---|---|---|
| Control | none | none | Reference average |
| 1 | 50 ppm AMA-324 | — | 50 ppm AMA-324 |
| 2 | 75 ppm AMA-324 | — | 75 ppm AMA-324 |
| 3 | 100 ppm AMA-324 | — | 100 ppm AMA-324 |
| 4 | 125 ppm AMA-324 | — | 125 ppm AMA-324 |
| 5 | 150 ppm AMA-324 | — | 150 ppm AMA-324 |
| 6 | 50 ppm GL 10 | — | 50 ppm GL 10 |
| 7 | 75 ppm GL 10 | — | 75 ppm GL 10 |
| 8 | 100 ppm GL 10 | — | 100 ppm GL 10 |
| 9 | 125 ppm GL 10 | — | 125 ppm GL 10 |
| 10 | 150 ppm GL 10 | — | 150 ppm GL 10 |
| 11 | 38 ppm GL 10 | 38 ppm AMA-324 | 75 ppm 1:1 GLAM |
| 12 | 25 ppm GL 10 | 50 ppm AMA-324 | 75 ppm 1:2 GLAM |
| 13 | 50 ppm GL 10 | 50 ppm AMA-324 | 100 ppm 1:1 GLAM |
| 14 | 33 ppm GL 10 | 67 ppm AMA-324 | 100 ppm 1:2 GLAM |
| 15 | 63 ppm GL 10 | 63 ppm AMA-324 | 125 ppm 1:1 GLAM |
| 16 | 42 ppm GL 10 | 84 ppm AMA-324 | 125 ppm 1:2 GLAM |
| 17 | 75 ppm GL 10 | 75 ppm AMA-324 | 150 ppm 1:1 GLAM |
| 18 | 50 ppm GL 10 | 100 ppm AMA-324 | 150 ppm 1:2 GLAM |

In this example, a test fluid was prepared from artificial sea water containing a mixed consortium of microbes originating from oil field well stimulation. 55 milliliter samples of the test fluid were placed in water anaerobic vials. Each of the respective biocides was added to a vial. For the exemplary biocidal systems, the biocides were sequentially added to the vial, as described in Table 1. Each test fluid was re-challenged 3 times. For the re-challenge, a mixed population of active bacteria in artificial sea water was added to each vial at the following points in time: 2 days, 3 days, and 6 days.

Figure 2:
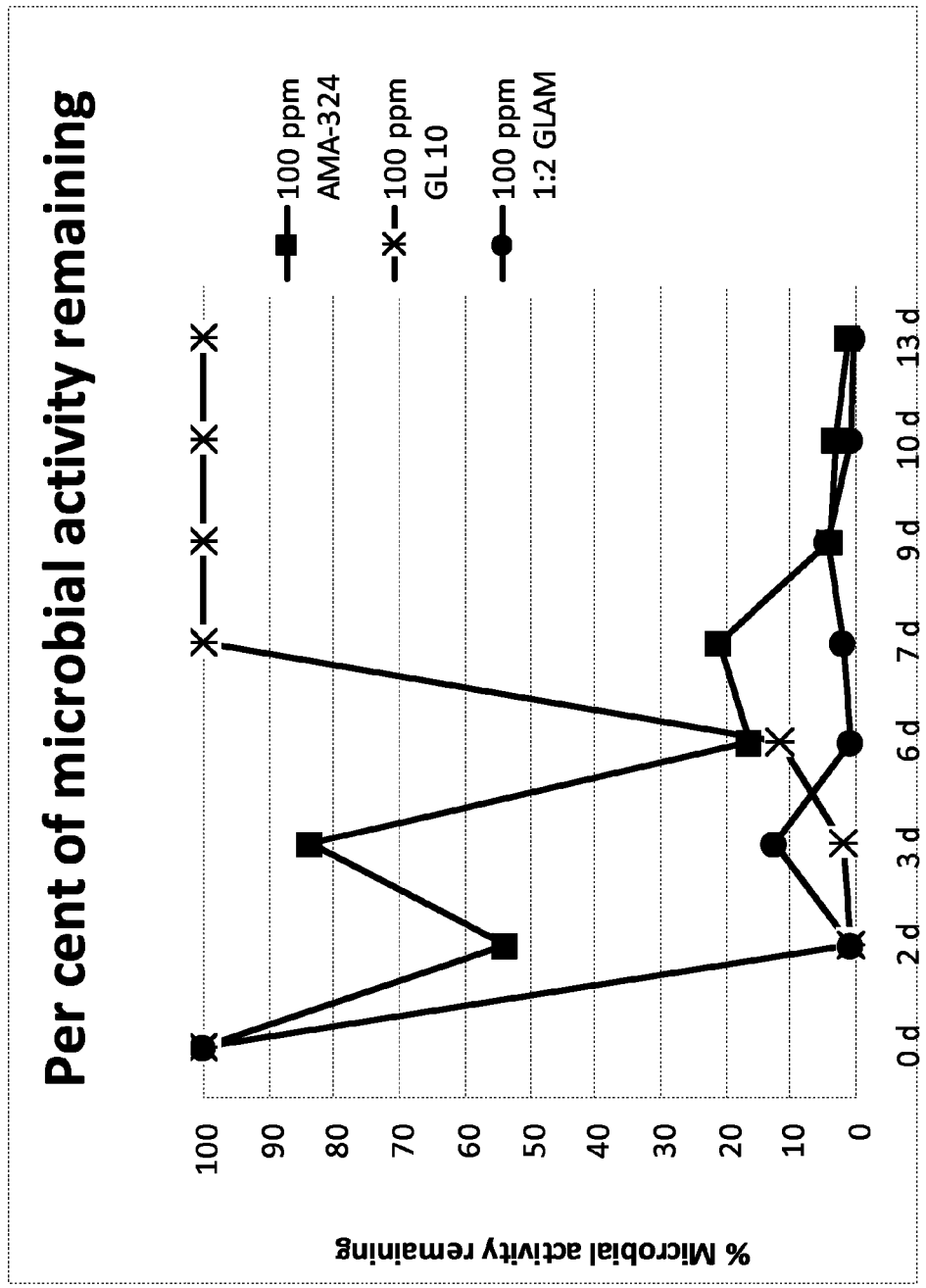
Figure 3:
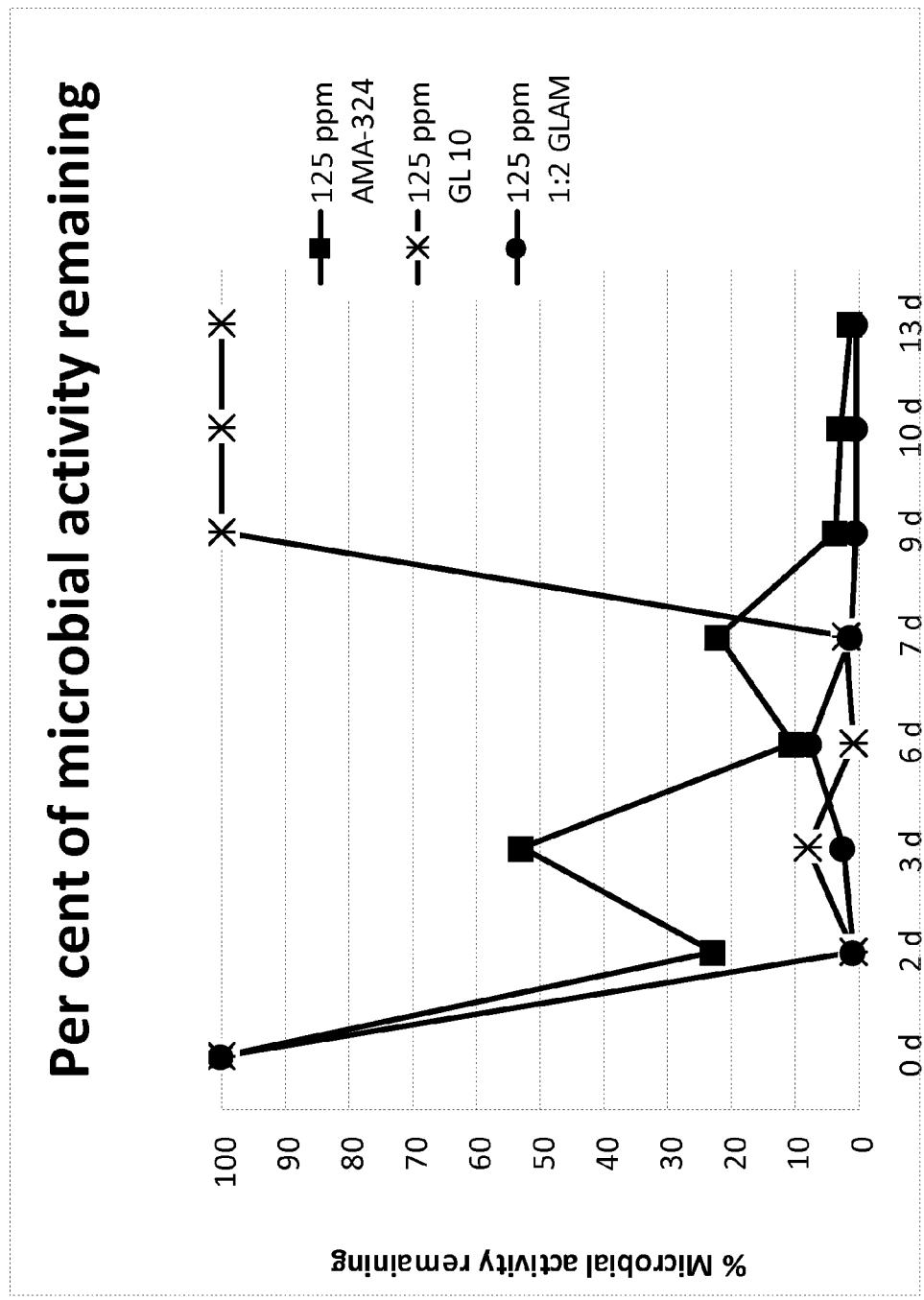

Adenosine triphosphate (ATP) is the energy unit found from all microbes and the level of ATP in a given sample can be used to monitor the microbial status. For each of the test samples, microbial activity was determined by measuring the level of ATP in each respective sample at predetermined intervals. The results are shown in Table 2. The results for samples with biocide concentration totals of 75, 100 or 125 ppm are also shown in FIGS. 1, 2 and 3.

TABLE 2

Percent Microbiological Activity Remaining for Biocidal System Tests, Example 1.

| | 0 d | 2 d | 3 d | 6 d | 7 d | 9 d | 10 d | 13 d |
|---|---|---|---|---|---|---|---|---|
| Control (untreated) | | 100 | 100 | 100 | 100 | 100 | 100 | 100 |
| 50 ppm AMA-324 | 100 | 97 | 100 | 57 | 40 | 12 | 7 | 2 |
| 75 ppm AMA-324 | 100 | 88 | 100 | 11 | 26 | 6 | 4 | 1 |
| 100 ppm AMA-324 | 100 | 54 | 84 | 16 | 21 | 4 | 3 | 1 |
| 125 ppm AMA-324 | 100 | 23 | 53 | 10 | 22 | 3 | 3 | 1 |
| 150 ppm AMA-324 | 100 | 7 | 33 | 8 | 15 | 3 | 2 | 1 |
| 50 ppm GL 10 | 100 | 1 | 19 | 100 | 100 | 100 | 100 | 100 |
| 75 ppm GL 10 | 100 | 1 | 3 | 100 | 100 | 100 | 100 | 100 |
| 100 ppm GL 10 | 100 | 1 | 2 | 11 | 100 | 100 | 100 | 100 |
| 125 ppm GL 10 | 100 | 1 | 8 | 1 | 2 | 100 | 100 | 100 |
| 150 ppm GL 10 | 100 | 1 | 1 | 1 | 1 | 0 | 1 | 2 |
| 75 ppm 1:1 GLAM | 100 | 1 | 11 | 2 | 3 | 0 | 1 | 0 |

TABLE 2-continued

Percent Microbiological Activity Remaining
for Biocidal System Tests, Example 1.

|  | 0 d | 2 d | 3 d | 6 d | 7 d | 9 d | 10 d | 13 d |
|---|---|---|---|---|---|---|---|---|
| 75 ppm 1:2 GLAM | 100 | 4 | 100 | 29 | 37 | 7 | 4 | 1 |
| 100 ppm 1:1 GLAM | 100 | 1 | 3 | 1 | 1 | 1 | 1 | 0 |
| 100 ppm 1:2 GLAM | 100 | 1 | 12 | 1 | 2 | 4 | 1 | 0 |
| 125 ppm 1:1 GLAM | 100 | 1 | 7 | 1 | 1 | 1 | 0 | 0 |
| 125 ppm 1:2 GLAM | 100 | 1 | 2 | 8 | 1 | 0 | 1 | 0 |
| 150 ppm 1:1 GLAM | 100 | 1 | 2 | 1 | 1 | 0 | 1 | 0 |
| 150 ppm 1:2 GLAM | 100 | 1 | 2 | 1 | 1 | 0 | 1 | 0 |

Note:
the vials were re-challenged at 2 d, 3 d, and 6 d.

Generally, the exemplary biocidal systems showed improved control of microbial activity, when compared to the commercially-available biocides.

Example 2

In this example, the effect of the delay between the components of the biocidal systems was further evaluated. The exemplary biocidal systems included a combination of glutaraldehyde and 3,5-dimethyl-1,3,5-thiadiazinane-2-thione at a total concentration of 50 ppm of the commercially available products Fennosan GL 10 and AMA-324 in a 1:2 ratio, i.e. 50 ppm 1:2 GLAM (17 ppm GL 10 and 33 ppm AMA-324). In each exemplary biocidal system, the components were sequentially added to a test fluid at the specified time periods. Specifically, glutaraldehyde was added to the test fluid first and 3,5-dimethyl1,3,5-thiadiazinane-2-thione was added to the test fluid at a specified time interval after the glutaraldehyde.

In this example, a test fluid was prepared from artificial sea water containing a mixed consortium of microbes originating from oil field well stimulation. 40 milliliter samples of the test fluid were placed in test bottles with a loosely closed cap enabling aerobic conditions during the experiment. Each of the respective biocides was added to a bottle. For the exemplary biocidal systems, the biocides were sequentially added to the bottle, as described in Table 3. Each test fluid was re-challenged 4 times. For the rechallenge, a mixed population of active bacteria in artificial sea water was added to each bottle at the following points in time: 27 hours, 2 days, 3 days and 6 days.

Figure 4:
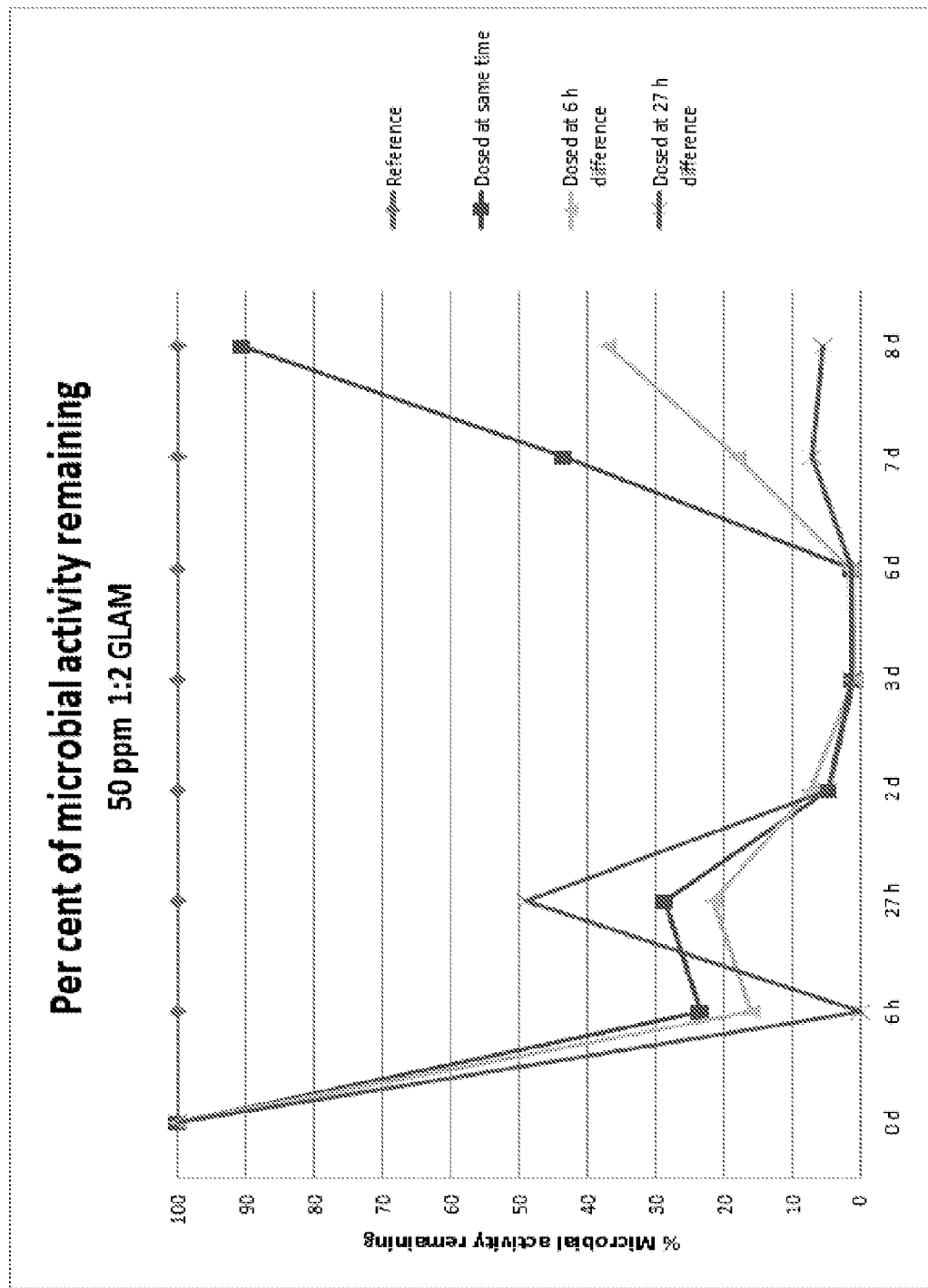
FIGS. 4 and 5 are graphs which illustrate the effect of the delay with respect to dosing the different components of exemplary biocidal systems on the microbial activity.

For each of the test samples, microbial activity was determined by measuring the level of ATP in each respective sample at predetermined intervals. The results are shown in FIG. 4.

TABLE 3

Biocidal System Samples, Example 2.

| Sample | Dosing | Biocide added |
|---|---|---|
| Control (Reference) | (untreated) | none |
| 1 | Dosed at same time | 50 ppm 1:2 GLAM |
| 2 | Dosed at 6 h difference | 50 ppm 1:2 GLAM |
| 3 | Dosed at 27 h difference | 50 ppm 1:2 GLAM |

Example 3

In this example, the effect of the delay between the components of the biocidal systems was further evaluated. The exemplary biocidal systems included a combination of glutaraldehyde and 3,5-dimethyl-1,3,5-thiadiazinane-2-thione at a total concentration of 50 ppm of the commercially available products Fennosan GL 10 and AMA-324 in a 1:2 ratio, i.e. 50 ppm 1:2 GLAM (17 ppm GL 10 and 33 ppm AMA-324). In each exemplary biocidal system, the components were sequentially added to a test fluid at the specified time periods. Specifically, glutaraldehyde was added to the test fluid first and 3,5-dimethyl-1,3,5-thiadiazinane-2-thione was added to the test fluid at a specified time interval after the glutaraldehyde.

In this example, a test fluid was prepared from artificial sea water containing a mixed consortium of microbes originating from oil field well stimulation. 40 milliliter samples of the test fluid were placed in test bottles with a loosely closed cap enabling aerobic conditions during the experiment. Each of the respective biocides was added to a bottle. For the exemplary biocidal systems, the biocides were sequentially added to the bottle, as described in Table 4. Each test fluid was re-challenged 2 times. For the rechallenge, a mixed population of active bacteria in artificial sea water was added to each bottle at the following points in time: 24 hours and 5 days.

Figure 5:
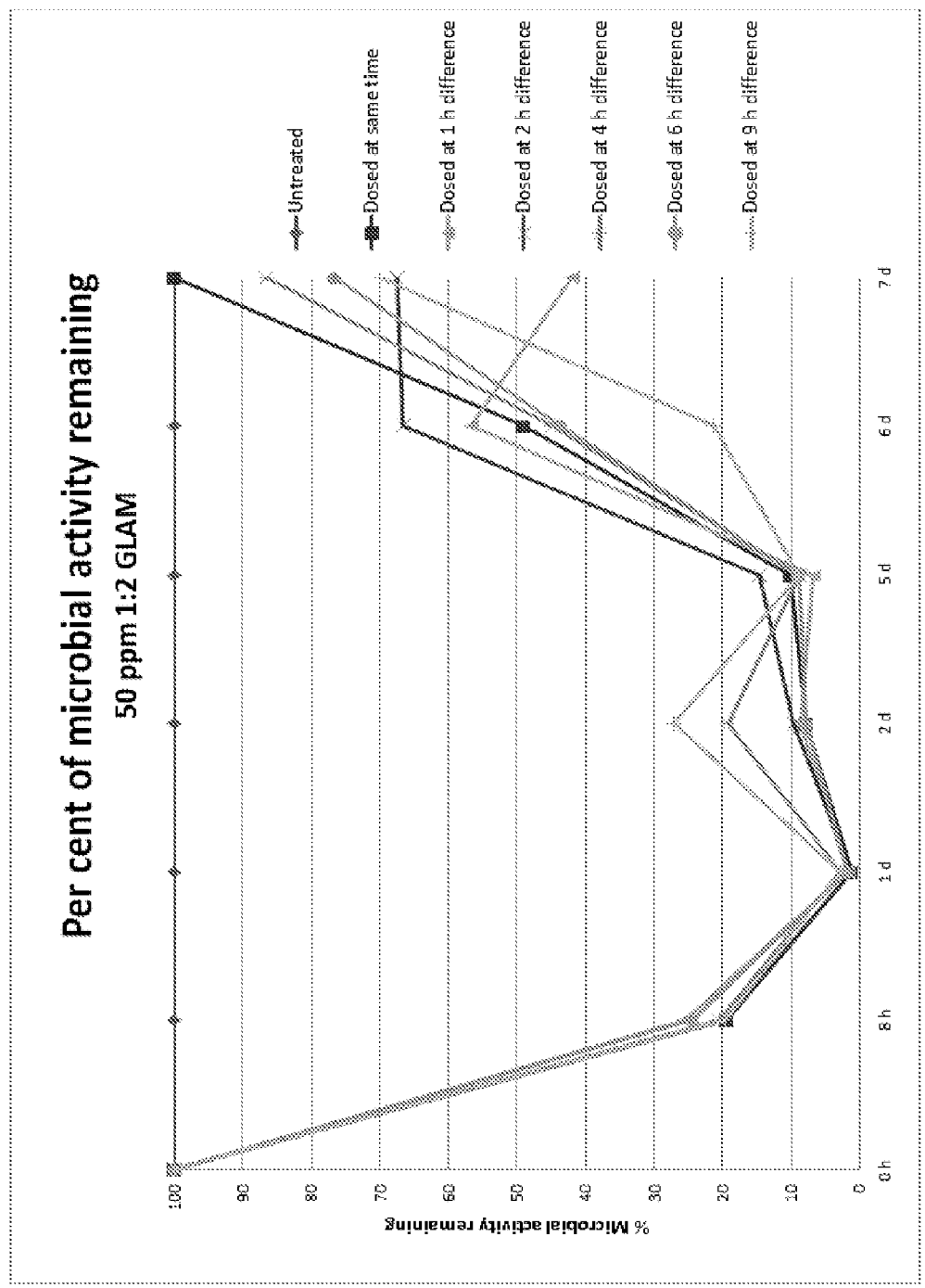

For each of the test samples, microbial activity was determined by measuring the level of ATP in each respective sample at predetermined intervals. The results are shown in FIG. 5.

TABLE 4

Biocidal System Samples, Example 3.

| Sample | Dosing | Biocide added |
|---|---|---|
| Control | (untreated) | none |
| 1 | Dosed at same time | 50 ppm GLAM 1:2 |
| 2 | Dosed at 1 h difference | 50 ppm GLAM 1:2 |
| 3 | Dosed at 2 h difference | 50 ppm GLAM 1:2 |
| 4 | Dosed at 4 h difference | 50 ppm GLAM 1:2 |
| 5 | Dosed at 6 h difference | 50 ppm GLAM 1:2 |
| 6 | Dosed at 9 h difference | 50 ppm GLAM 1:2 |

We claim:

1. A method of treating a gas field fluid or oil field fluid comprising microbes, the method comprising: a) adding glutaraldehyde to the gas field fluid or oil field fluid in an amount effective to reduce or inhibit microbial activity; and b) after a delay, adding 3,5-dimethyl-1,3,5-thiadiazinane-2-thione to the gas field fluid or oil field fluid; wherein the delay is from about 1 hour to about 48 hours; and wherein the weight ratio of the 3,5-dimethyl-1,3,5-thiadiazinane-2-thione to the glutaraldehyde, as active ingredients, is in the range of about 2:1 to about 1:1.

2. The method of claim 1, wherein the combined concentration of the 3,5-dimethyl-1,3,5-thiadiazinane-2-thione and the glutaraldehyde, as active ingredients, in the fluid is in the range of 5 ppm to 1000 ppm.

3. The method of claim 1, wherein the combined concentration of the 3,5-dimethyl-1,3,5-thiadiazinane-2-thione and the glutaraldehyde, as active ingredients, in the fluid is in the range of about 25 ppm to about 50 ppm.

4. The method of claim 1, wherein the concentration of the 3,5-dimethyl-1,3,5-thiadiazinane-2-thione, as active ingredient, in the fluid is at least about 5 ppm.

5. The method of claim 1, wherein the gas field fluid or oil field fluid is a stimulation fluid, squeeze fluid, fracturing fluid, drilling mud, workover or completion fluid, hydrotest fluid, water injection or fluid injection for reservoir maintenance or Enhanced Oil Recovery (EOR).

6. The method of claim 1, wherein the delay is from about 1 hour to about 27 hours.

7. The method of claim 1, wherein the delay is from about 1 hour to about 9 hours.

\* \* \* \* \*